(12) United States Patent
Altemus, Jr. et al.

(10) Patent No.: US 6,360,875 B1
(45) Date of Patent: Mar. 26, 2002

(54) CONVEYOR BELT SCRAPER TENSIONER

(76) Inventors: William H. Altemus, Jr., 6910 Tracey Ct., P.O. Box 1673, Gloucester, VA (US) 23061; Ray V. Rodgers, III, P.O. Box 493, Urbanna, VA (US) 23175

( * ) Notice: Subject to any disclaimer, the term of this patent is extended or adjusted under 35 U.S.C. 154(b) by 0 days.

(21) Appl. No.: 09/596,645

(22) Filed: Jun. 19, 2000

(51) Int. Cl.[7] ............................................. B65G 45/16
(52) U.S. Cl. ........................................ 198/499; 15/256.5
(58) Field of Search .............................. 198/497, 498, 198/499; 15/256.5, 256.51

(56) References Cited

U.S. PATENT DOCUMENTS

| | | |
|---|---|---|
| 3,674,131 A | 7/1972 | Matson |
| 3,841,470 A | 10/1974 | Meguro |
| 4,053,045 A | 10/1977 | Reiter |
| 4,489,823 A * | 12/1984 | Gordon ...................... 198/499 |
| 4,533,036 A | 8/1985 | Gordon |
| 4,754,868 A | 7/1988 | Hughes |
| 4,768,644 A | 9/1988 | Cromm |
| 4,936,439 A | 6/1990 | Alexander, Jr. |
| 4,995,851 A * | 2/1991 | Taylor et al. ........... 198/499 X |
| 5,201,402 A | 4/1993 | Mott |
| 5,845,761 A * | 12/1998 | Davidts et al. .............. 198/499 |
| 6,056,112 A * | 5/2000 | Wiggins ...................... 198/499 |
| 6,283,274 B1 * | 9/2001 | Dolan et al. ................. 198/499 |

* cited by examiner

*Primary Examiner*—Joseph D. Pape
*Assistant Examiner*—Lori L. Coletta
(74) *Attorney, Agent, or Firm*—Moore, Foard & Dias; Richard M. Foard

(57) ABSTRACT

A conveyor belt scraper tensioner consisting of a blade mounted on a rotatable axle and rotatably biased into the conveyor belt by means of a folded elastomeric biasing medium affixed at one end to a fixed flange and affixed at the other end to a rotatable flange mounted on said scraper blade axle. Typically one tensioning device would be used on each scraper blade axle, although dual devices mounted at each end of the scraper blade axle may be employed when desired. Additionally, the scraper blade tensioner may be fitted with a movement limiting chain to prevent the scraper blade from being drawn into and gouging the conveyor belt as the blade wears or when encountering material tightly adhered to the conveyor belt surface. A slab of gum rubber is the preferred elastomeric biasing material, however other suitable elastomeric materials may be employed.

11 Claims, 5 Drawing Sheets

CONVEYOR BELT SCRAPER TENSIONER

BACKGROUND OF THE INVENTION

The present invention relates generally to a primary conveyor belt scraper for removing unwanted material from the surface of a conveyor belt. Conveyor belts are typically used in varying industrial applications for carrying products from one point to another. In many manufacturing and agricultural applications, conveyor belts are used to transport bulk materials. In such uses it is frequently necessary to ensure that all of the product carried to its destination is removed from the return run of the conveyor belt in order to minimize wear and strain on the conveyor belt machinery. To this end, conveyor belts typically employ a primary scraper and a series of secondary scrapers to remove all product, particularly in situations where the product may have a tendency to adhere to the conveyor belt surface. In many applications, a conveyor belt primary scraper is deployed against the belt as it passes over the head, or turn-around, drum at the outbound terminus of the conveyor belt. A scraper blade so situated can then exert considerable pressure against the flexible belt as the same is backed up by the head drum.

Since many industrial conveyor belts are employed to carry abrasive and/or corrosive materials, it is important that all possible materials be removed from the conveyor belt surface on the return run in order to minimize wear and tear on the conveyor belt machinery. For this reason, a conveyor belt primary scraper must remove as much material as possible consistent with reasonable friction and wear on the conveyor belt surface. Typically conveyor belt primary scrapers employ some form of spring or flexible means of biasing the scraper blade against the conveyor belt. This is necessary in order to accommodate irregularities in conveyor belt thickness and splices in the belt as well as variations in the operating radius of the conveyor belt head drum and variations in the amount and adhesiveness of material accumulations on the conveyor belt surface.

Because by design the conveyor belt primary scraper must remove unwanted material from the conveyor belt surface, it must be able to exert a uniform, acceptable pressure on the belt surface so as to achieve a compromise between removing the desired material and minimizing wear and friction losses. It must further be able to withstand the abrasive and/or corrosive environments created by the material being removed. Since conveyor belts often operate in extremely harsh environments, it is desirable that a conveyor belt primary scraper be resistant to corrosion and abrasion and that it be readily accessible and easily repaired in the event that maintenance is required. Conventional spring biased scraper assemblies have the disadvantage of suffering unduly from corrosion and becoming jammed or clogged by accretions of removed product so as to interfere with the tension exerted.

It is further desirable that the conveyor belt primary scraper be adaptable to most of the conveyor belt machines in general industrial use and that the scraper assembly require a minimum of maintenance and a minimum of down time in order to accomplish maintenance. It is further desirable that the conveyor belt primary scraper be easily adjustable as to the amount of tension exerted by the scraper blade on the conveyor belt and that the tensioning device be further adjustable so as to provide a limited amount of travel to prevent the scraper blade from digging into the belt as the blade wears down. Accordingly, for these and other reasons the need exists for a low maintenance, easily adjustable and inexpensive conveyor belt primary scraper tensioner which is adaptable to existing conveyor belt machines.

Prior art devices teach many designs and configurations of conveyor belt primary and secondary scraper systems including spring biasing systems in many configurations and elastomeric mounting systems in many configurations. However, no other prior art teaches an elastomeric rotatably biased primary scraper assembly which is easily maintained and adjusted, corrosion resistant and inexpensive to make and service as is found in the present invention.

SUMMARY OF THE INVENTION

It is therefore an object of the present invention to develop an adjustable, low cost, low maintenance, conveyor belt scraper tensioner for use on a wide variety of conveyor belt machines.

It is another object of the present invention to provide a conveyor belt scraper tensioner assembly which is resistant to corrosion, abrasion and deterioration from ultraviolet light.

It is yet another object of the present invention to provide a conveyor belt scraper tensioner assembly which is resistant to clogging by foreign bodies and resistant to physical damage from impacts.

It is yet still another object of the present invention to provide a conveyor belt scraper tensioner which is easily adjustable as to the amount of tension the scraper blade exerts against the conveyor belt.

It is yet still another object of the present invention to provide a conveyor belt scraper tensioner assembly which is easily adjustable so as to provide a limited amount of travel and thus prevent damage to the conveyor belt and conveyor machine assembly as the scraper blade wears away.

It is yet still another object of the present invention to provide a conveyor belt scraper tensioner which may be easily mounted in any attitude and at either side of a conveyor belt machine.

It is yet still another object of the present invention to provide a conveyor belt scraper tensioner which is easily maintained and repaired.

It is yet still a further object of the present invention to provide a conveyor belt scraper tensioner assembly which is simpler than competing designs and is cheaper to manufacture.

According to one embodiment of the present invention, the foregoing and other objects are obtained by providing a conveyor belt scraper tensioner having an elastomeric means of biasing a scraper blade against the conveyor belt and which is capable of being mounted on most existing conveyor belt machines. The conveyor belt scraper tensioner is provided with one or more folded slab elastomeric biasing media affixed to a fixed flange mounted on the conveyor machine frame and to a rotatable flange mounted on the scraper blade axle. Means are provided for varying the attachment point of the rotatable flange on the scraper blade axle in order to easily and readily adjust the tension exerted by the scraper blade against the conveyor belt surface. A chain or other suitable movement limiting means may also be provided to limit the movement of the rotatable flange relative to the fixed flanged in order to prevent the scraper blade from digging into the conveyor belt surface.

DESCRIPTION OF THE PREFERRED EMBODIMENT

Figure 1:
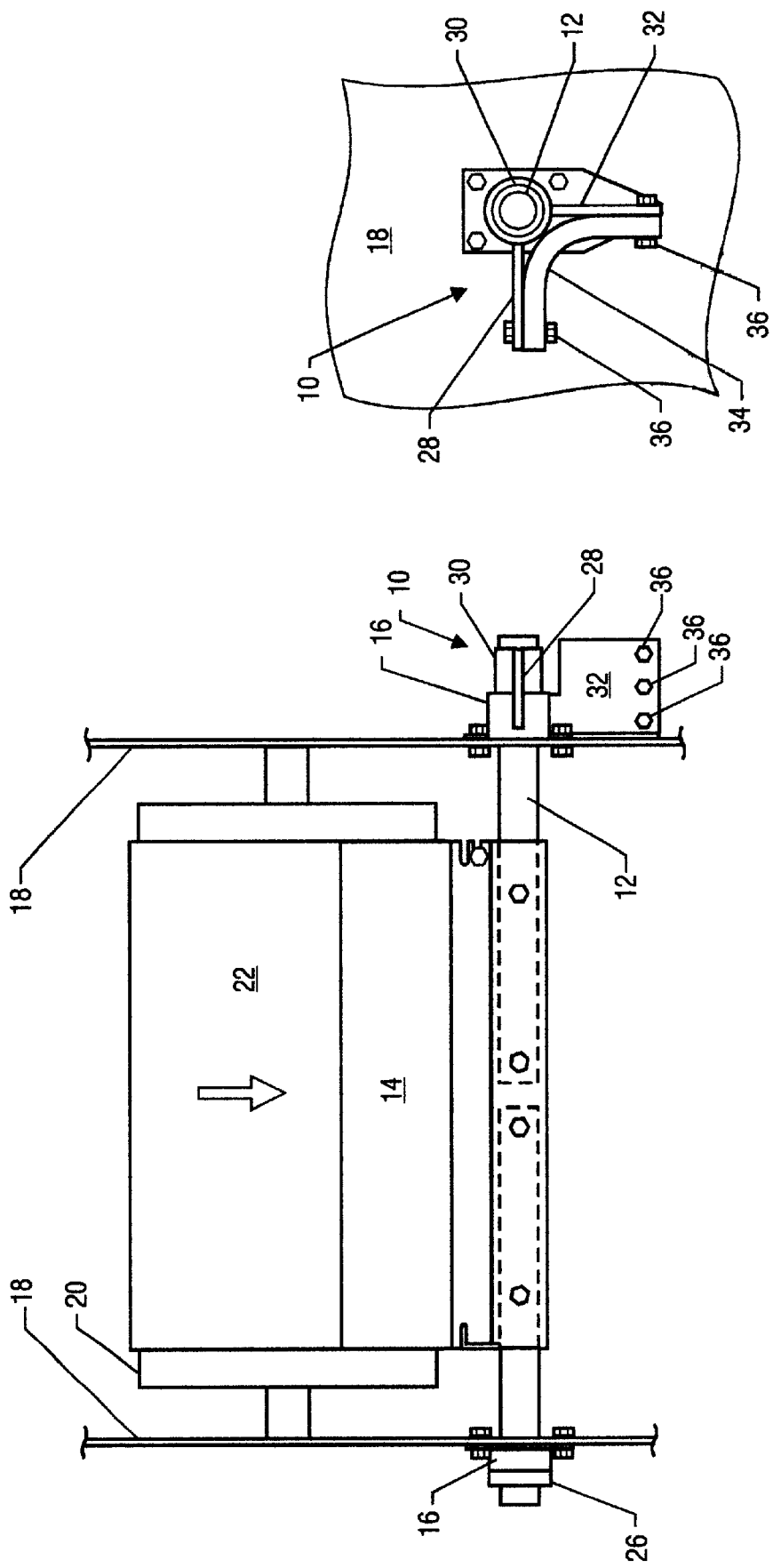
FIG. 1. is an end and side elevation view of a device constructed according to the present invention.
Figure 2:
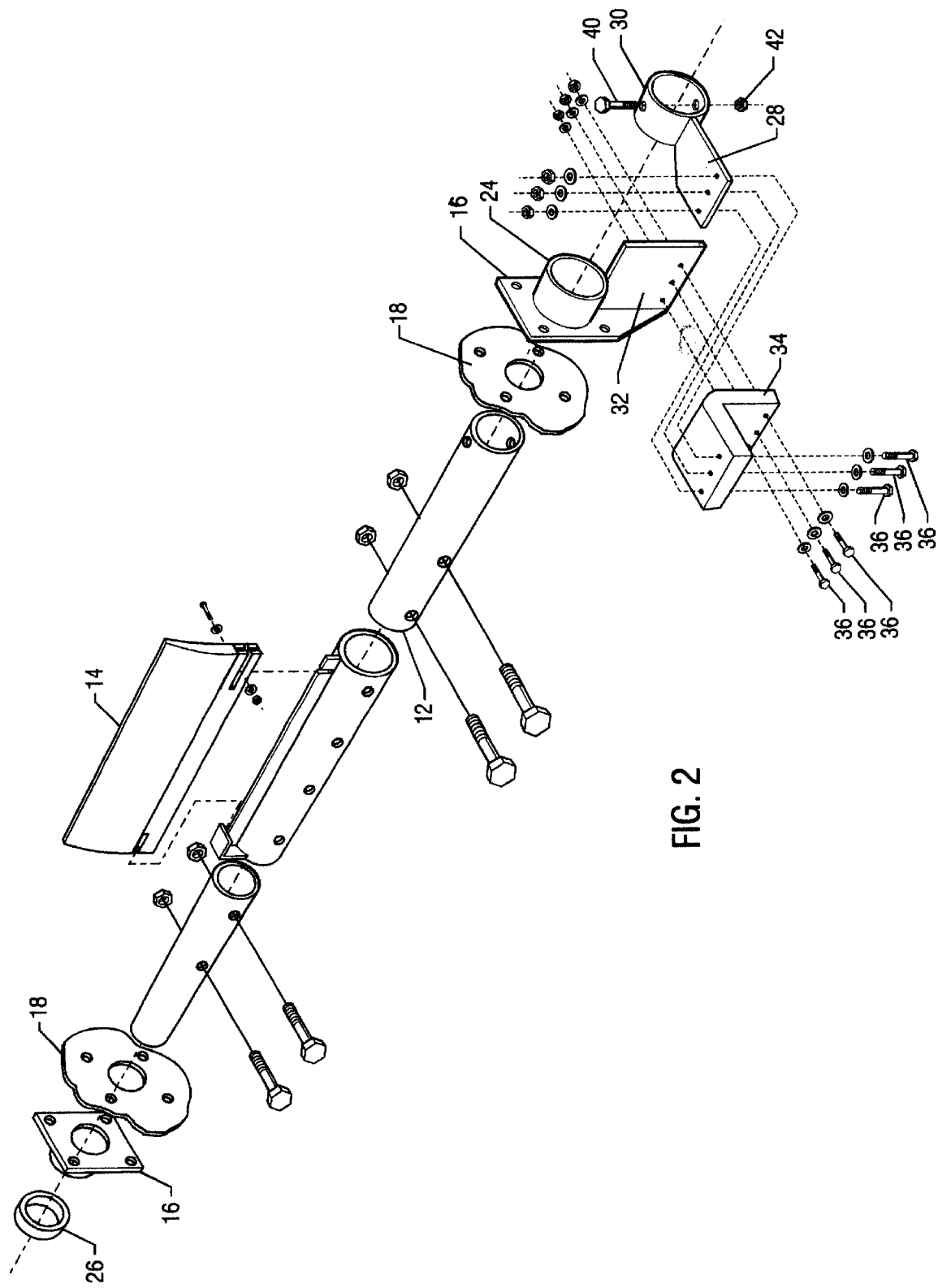
FIG. 2. is a perspective, exploded view of a device constructed according to the present invention showing broken away sections of the conveyor belt machine upon which the invention is mounted.

Referring now to the drawings wherein like reference characters designate identical or corresponding parts, and more particularly to FIGS. 1 and 2, there are shown an elevation view and a perspective, exploded view of the present invention, designated generally by the reference numeral 10. The invention is comprised basically of a rotatable axle 12 having a conveyor belt scraper blade 14 affixed thereto and rotatably mounted on bushings carried in a pair of bearing housings 16 which are fixedly mounted to the conveyor machine framework 18. Scraper blade 14 is constructed of polyurethane or other workable material and may be attached to axle 12 by means of cap screws, locking tabs, set screws or any other convenient and workable means. The conveyor machine head, or turn-around, drum 20 is also rotatably mounted on the conveyor machine frame 18 and serves to support and reverse the direction of travel of conveyor belt 22.

In a typical application, both ends of axle 12 extend entirely through the conveyor machine frame 18 and are rotatably supported on bushings 24 constructed of ultra high molecular weight polyethylene and mounted within bearing housings 16. In most applications one end of axle 12 will be fitted with a locking collar 26 which is affixed to axle 12 in order to limit the axial motion thereof. Locking collar 26 may be secured to axle 12 by means of welding, a set screw, a through bolt or any other workable means.

The other end of axle 12 also extends entirely through bearing housing 16 and is provided within an adjustable, rotatable flange 28, which flange is mounted on collar 30. Collar 30 is fitted to axle 12 with a sufficiently loose fit to enable it to be rotated with respect to axle 12. On the same side of the conveyor belt machine frame 18, bearing housing 16 is fitted with a fixed flange 32 which may be secured to bearing housing 16 and its mounting plate by means of welding, fabrication in one piece or other workable means. If desired, fixed flange 32 may be affixed directly to conveyor belt machine frame 18 and not made as a part of bearing housing 16.

Tensioning medium 34 (not shown in the end view portion of FIG. 1 for clarity purposes) is comprised of a folded rectangular slab of elastomeric material affixed at one end to fixed flange 32 by means of cap screws 36 or other workable means. Tensioning medium 34 is affixed at its other end to adjustable flange 28 by means of cap screws 36 or other workable means after folding medium 34 in approximately in the middle, with the angle of bend being closer to the center line of axle 12 than to the point of attachment to flanges 32 and 28. Tensioning medium 34 is preferably made of gum rubber; however, it should be noted that any other suitable elastomeric material may be substituted therefor.

At this point it should be noted that tensioning medium 34 is incapable of exerting any rotational torque on axle 12 until such time as adjustable flange 28 is pinned, or otherwise secured, to axle 12 by means of a through bolt or other workable means, for example a set screw. Once the scraper assembly constructed according to present invention is mounted on conveyor belt frame 18, its preset tension, or preload, may be accomplished by pinning rotatable flange collar 30 to axle 12 after compressing tensioning medium 34 to the desired degree.

Figure 3:
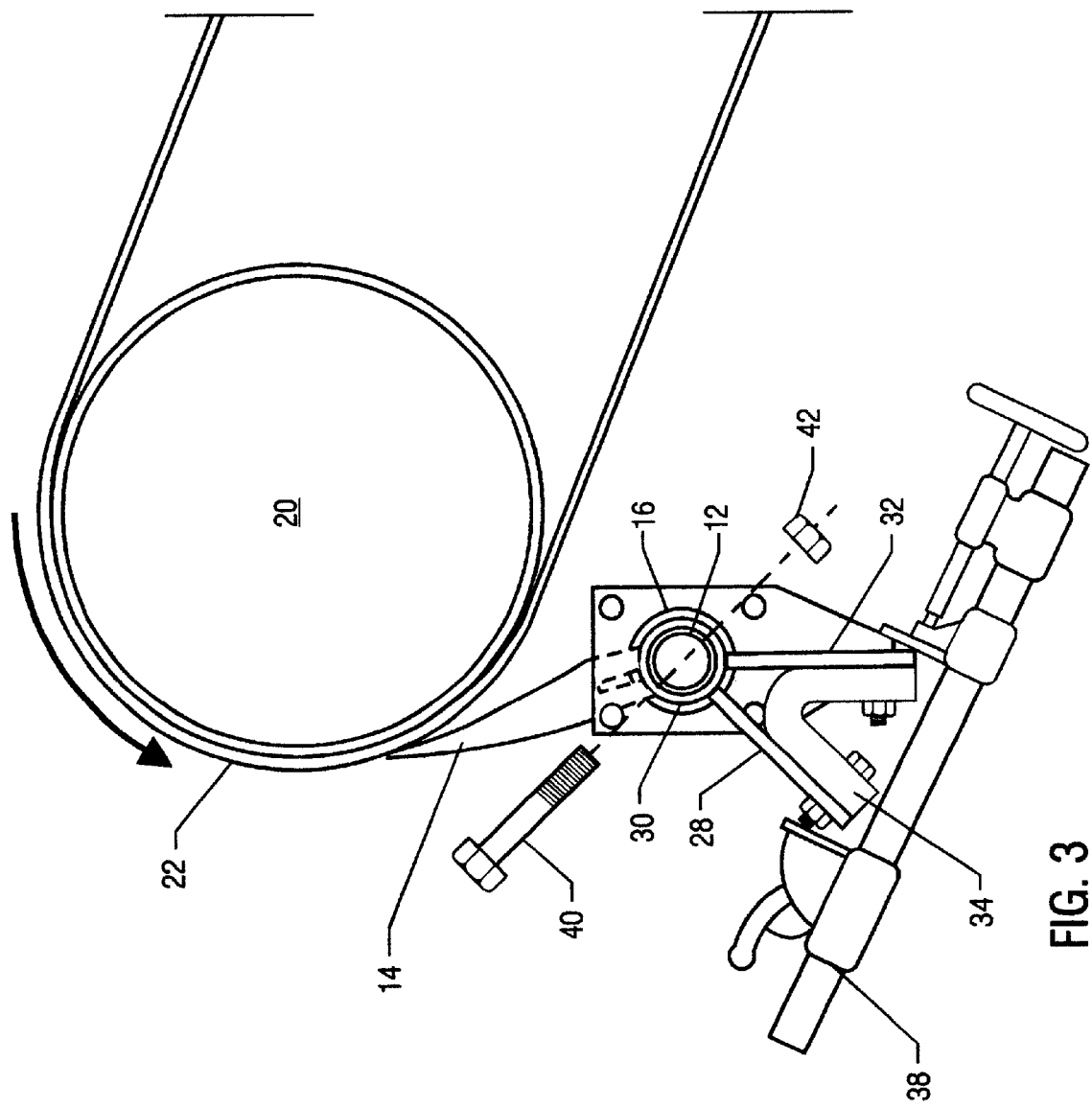
FIG. 3. is a partial side elevation view of the present invention.
Figure 4:
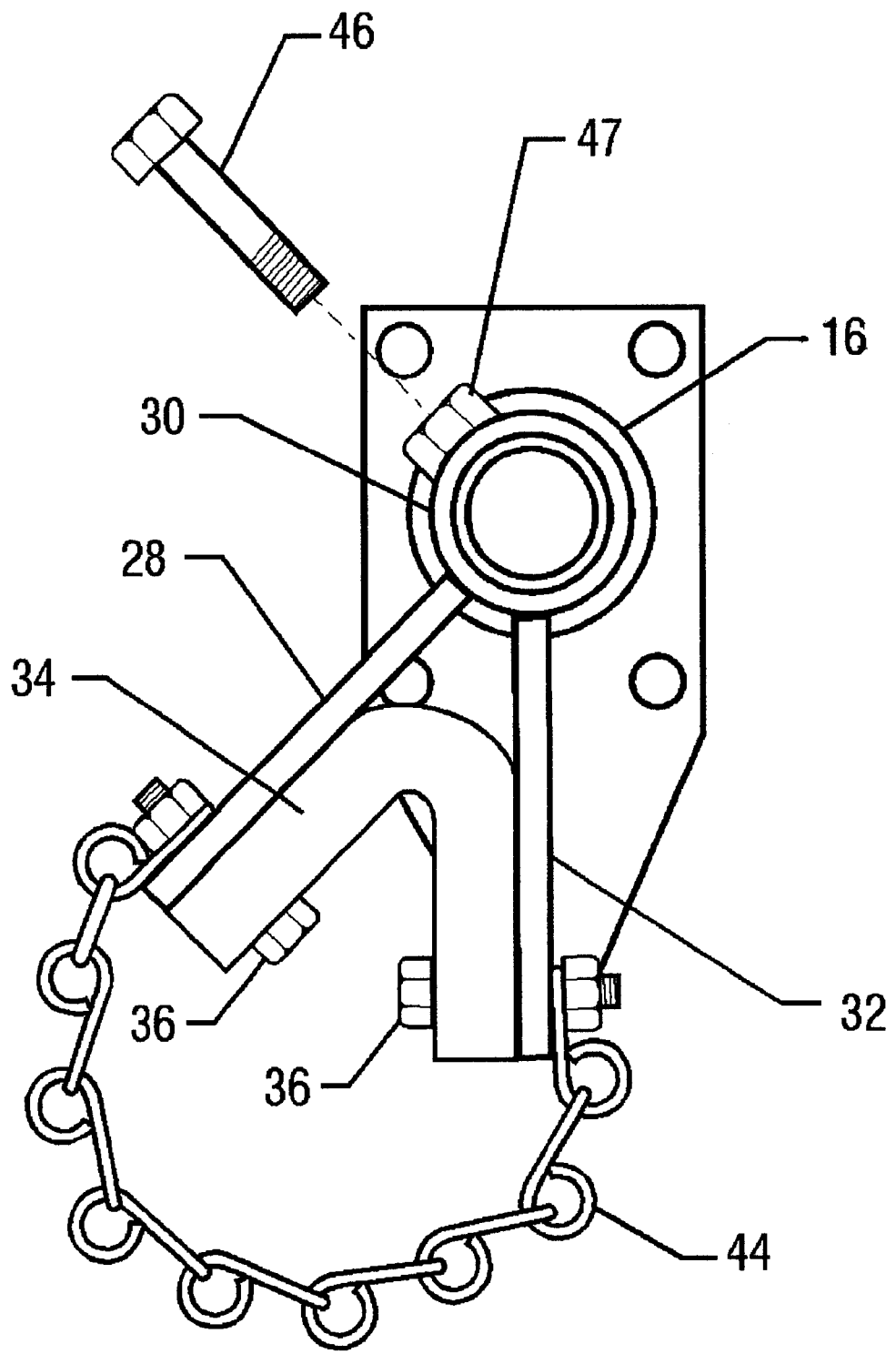
FIG. 4. is a partial side elevation view of an alternate embodiment of the present invention.

Referring now to FIG. 3, such tensioning is accomplished by compressing flange 28 toward flange 32, and thus compressing elastomeric tensioning medium 34, by means of bar clamp 38 or other workable means. Once the desired compression of medium 34 is achieved, an operator would hold scraper blade 14 against conveyor belt 22 as the same passes over drum 20 and then drill a hole entirely through collar 30 and axle 12 to receive through bolt 40 and nut 42. After securing through bolt 40 and releasing bar clamp 38, tensioning medium 34 will then exert. rotational torque on axle 12 by means of flange 28 and thus force scraper blade 14 into the surface of conveyor belt 22. As shown in FIG. 4, a set screw 46 and nut 47 affixed to collar 30 may be employed to secure collar 30 to axle 12 in lieu of through bolt 40 and nut 42.

It should be noted that the torque exerted by tensioning medium 34 on axle shaft 12 by means of adjustable flange 28 could be varied by providing a series of diametric holes passing entirely through adjustable flange collar 30 and axle 12 in order to provide different degrees of folding, or compression, of tensioning medium 34 when scraper blade 14 is in contact with conveyor belt 22. In those embodiments of the present invention employing a set screw in lieu of a through bolt, scraper blade pressure may be varied by loosening set screw 46 and repositioning collar 30 with respect to scraper axle 12 and then retightening set screw 46. A variable degree of pressure by scraper blade 14 upon conveyor belt 22 might be desirable in order to minimize belt and scraper blade wear and friction and when removing some materials which are less adherent to conveyor belt 22 than others.

Referring again to FIG. 4 it should be noted that movement limiting chain 44 may be provided between fixed flange 32 and adjustable flange 28 in order to prevent over-rotation of scraper blade 14 into conveyor belt 22. This would prevent scraper blade 14 from digging in, or gouging, the surface of conveyor belt 22 as the scraper blade wears during normal operation. It would further serve as a damage limiting device to prevent scraper blade 14 from being drawn into conveyor belt 22 in those circumstances where blade 14 may encounter material which is tightly adhered to conveyor belt 22.

Figure 5:
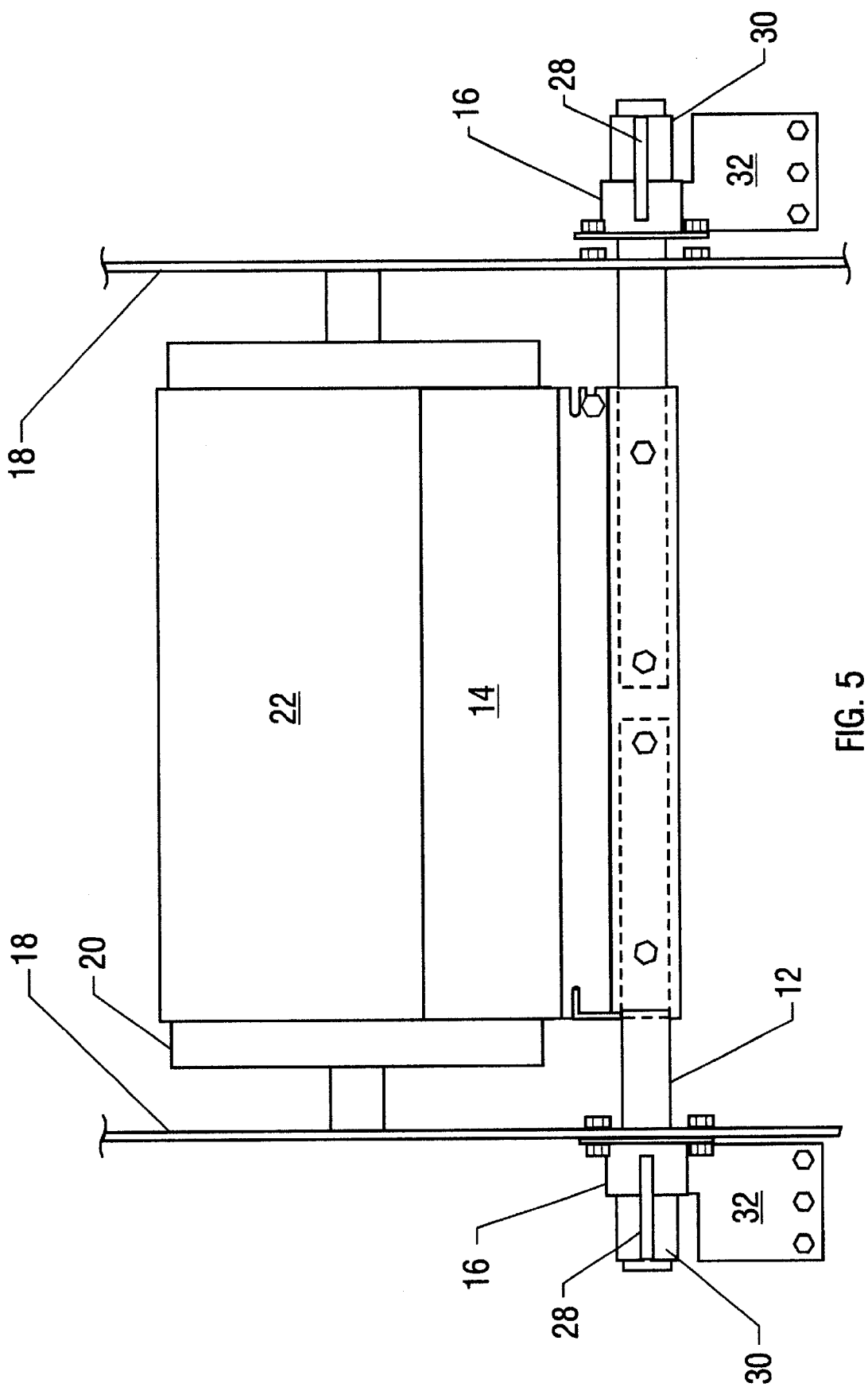
FIG. 5. is an elevation view of another alternate embodiment of the present invention.

Turning now to FIG. 5 there is shown an alternate embodiment of the present invention employing a plurality of primary scraper blade tensioning devices. In this example two tensioning devices (shown without tensioning medium 34 for purposes of clarity) comprised of adjustable flanges 28, fixed flanges 32 and elastomeric tensioning media are employed, one at each end of axle 12. The use of multiple tensioning devices may be desirable in those circumstances where the location of the conveyor belt terminus makes maintenance difficult, in order to provide for redundant tensioning in the event of failure of one tensioning device, and on certain very wide conveyor machines.

In operation, the present invention may be practiced by installing the same on conveyor machine frame 18 as hereinabove provided and providing a preload tension as also described above.. As more or less tension was needed on account of wear of scraper blade 14 or variation in pressure required to remove conveyed materials, the tension exerted by the present invention could be varied by providing different through bolt holes though collar 30 and axle 12 to achieve the desired tension or by repositioning collar 30 with respect to axle 12 by means of set screw 46. Furthermore, should elastomeric tensioning medium 34 fail or a different level of tension be desired, either higher or lower, elastomeric tensioning medium 34 is easily accessible and quickly replaced. In addition, ultra high molecular weight polyethylene bushings 24 provide a long, low friction service life in hostile environments and should not require frequent replacement. Nonetheless, should the need arise, bushings 24 and bearing housings 16 may be easily and quickly replaced.

The present invention teaches the use of multiple materials from which the components of the present invention may be constructed. In practice it has been found that gum rubber yields the best results for tensioning medium 34 and that ultra high molecular weight polyethylene yields the best compromise between low friction, expense and durability for axle support bushings 24.

In summary, a conveyor belt scraper tensioner constructed according to the present invention is far cheaper to manufacture and operate than existing conveyor belt scraper tensioners and is further more resistant to damage and failure from a hostile environment and is easier and cheaper to maintain than existing tensioners.

It should be noted that the present invention can be practiced with many variations of materials, including the use of metals, plastics or other materials in the construction of its various components. Obviously numerous additional modifications of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A conveyor belt scraper tensioner comprising:
   a conveyor belt scraper blade affixed to a rotatable axle;
   a pair of bearings for rotatably mounting said rotatable axle on a conveyor belt machine frame each of which is comprised of an ultra high molecular weight polyethylene bushing mounted in a bearing housing;
   a fixed flange fixedly mounted on the base plate of one of said bearings;
   an adjustable, rotatable flange affixed to a collar rotatably mounted on said scraper blade axle and variably affixed to said scraper blade axle by means of a set screw passing through said collar and bearing against said axle;
   a folded slab elastomeric tensioning device for rotatably biasing said scraper blade axle comprised of a folded slab of gum rubber affixed at one end to said fixed flange by a plurality of cap screws and nuts and affixed at the other end to said adjustable, rotatable flange by a plurality of cap screws and nuts;
   and a length of chain for limiting the relative movement between said fixed flange and said adjustable, rotatable flange affixed at one end to said fixed flange and affixed at the other end to said adjustable, rotatable flange.

2. A conveyor belt scraper tensioner comprising:
   a conveyor belt scraper blade affixed to a rotatable axle;
   a plurality of bearing means for rotatably mounting said axle on a conveyor belt machine frame;
   fixed flange means mounted on said conveyor belt machine frame;
   adjustable, rotatable flange means mounted on and affixed to said rotatable scraper blade axle; and
   a folded elastomeric tensioning means affixed between said fixed flange means and said adjustable rotatable flange means for rotatably biasing said rotatable scraper blade axle.

3. A conveyor belt scraper tensioner as in claim 2 further provided with:
   means for limiting the maximum relative movement between said fixed flange means and said adjustable, rotatable flange means.

4. A conveyor belt scraper tensioner as in claim 3 wherein:
   said fixed flange means mounted on said conveyor belt machine frame comprises a flange fixedly mounted on the base plate of one of said plurality of bearing means for rotatably mounting said axle on a conveyor belt machine frame.

5. A conveyor belt scraper tensioner as in claim 4 wherein:
   said adjustable, rotatable flange means mounted on said rotatable scraper blade axle comprises a flange affixed to a collar rotatably mounted on said scraper blade axle and variably affixed to said scraper blade axle by means of a set screw passing through said collar and bearing against said axle.

6. A conveyor belt scraper tensioner as in claim 5 wherein:
   said folded elastomeric tensioning means comprises a slab of elastomeric material affixed to said fixed flange means by a plurality of screw fasteners and affixed to said adjustable, rotatable flange means by a plurality of screw fasteners.

7. A conveyor belt scraper tensioner as in claim 6 wherein:
   said folded slab elastomeric tensioner means comprises a slab of gum rubber.

8. A conveyor belt scraper tensioner as in claim 7 wherein:
   said bearing means are provided with a bushing constructed of ultra high molecular weight polyethylene.

9. A conveyor belt scraper tensioner as in claim 8 wherein:
   said means for limiting the maximum relative movement between said fixed flange means and said adjustable, rotatable flange means comprises a length of chain affixed at one end to said fixed flange means and affixed at the other end to said adjustable, rotatable flange means.

10. A conveyor belt scraper tensioner as in claim 4 wherein:
    said adjustable, rotatable flange means mounted on said rotatable scraper blade axle comprises a flange affixed to a collar rotatably mounted on said scraper blade axle and variably affixed to said scraper blade axle by means of a cap screw and nut passing through said collar and said axle.

11. A conveyor belt scraper tensioner as in claim 3 wherein:
    said fixed flange means mounted on said conveyor belt machine frame comprises a plurality of fixed flanges mounted on said conveyor belt machine frame; and
    said adjustable, rotatable flange means mounted on said rotatable scraper blade axle comprises a plurality of adjustable, rotatable flanges mounted on said rotatable scraper blade axles; and
    said folded, elastomeric tensioning means affixed between said fixed flange means and said adjustable, rotatable flange means comprises a plurality of folded, elastomeric slab tensioning means affixed between each of said plurality of fixed flanges and said plurality of fixed flanges and said plurality of adjustable, rotatable flanges mounted on said rotatable scraper blade axle; and said means for limiting the maximum relative movement between said fixed flange means and said adjustable, rotatable flange means comprises a plurality of means for limiting the maximum relative movement between each of said plurality of fixed flanges and said plurality of adjustable, rotatable flanges.

* * * * *